United States Patent [19]

Van Gilluwe et al.

[11] Patent Number: 4,626,627
[45] Date of Patent: Dec. 2, 1986

[54] TELEPHONE LINE SELECTOR FOR USE WITH A PBX

[75] Inventors: Frank L. Van Gilluwe, Sunnyvale; Samuel B. Dunham, Santa Clara; Douglas A. Cross, San Mateo, all of Calif.

[73] Assignee: Teledex, Santa Clara, Calif.

[21] Appl. No.: 540,135

[22] Filed: Oct. 7, 1983

[51] Int. Cl.[4] ............... H04M 3/50; H04Q 3/64
[52] U.S. Cl. .................. 379/214; 379/265; 379/308
[58] Field of Search ........... 179/99 M, 99 H, 27 FH, 179/27 FG, 27 D, 18 ES, 18 AD

[56] References Cited

U.S. PATENT DOCUMENTS

| | | | |
|---|---|---|---|
| 3,843,845 | 10/1974 | Ridley | 179/99 M |
| 4,196,316 | 4/1980 | McEowen et al. | 179/18 ES |
| 4,376,875 | 3/1983 | Betrne | 179/18 B |
| 4,383,137 | 5/1983 | Aikawa et al. | 179/18 ES |
| 4,408,100 | 10/1983 | Pritz et al. | 179/27 D |
| 4,451,705 | 5/1984 | Burke et al. | 179/27 D |

Primary Examiner—Thomas W. Brown
Attorney, Agent, or Firm—Thomas E. Schatzel

[57] ABSTRACT

A device for use with executive and secretarial telephone units associated in a work group, having a programmable microprocessor which selectively controls the connection of incoming telephone lines to the secretarial telephone units and monitors the status of the telephone lines and provides such information to the secretarial telephone units.

8 Claims, 4 Drawing Figures

Microfiche Appendix Included
(76 Microfiche, 2 Pages)

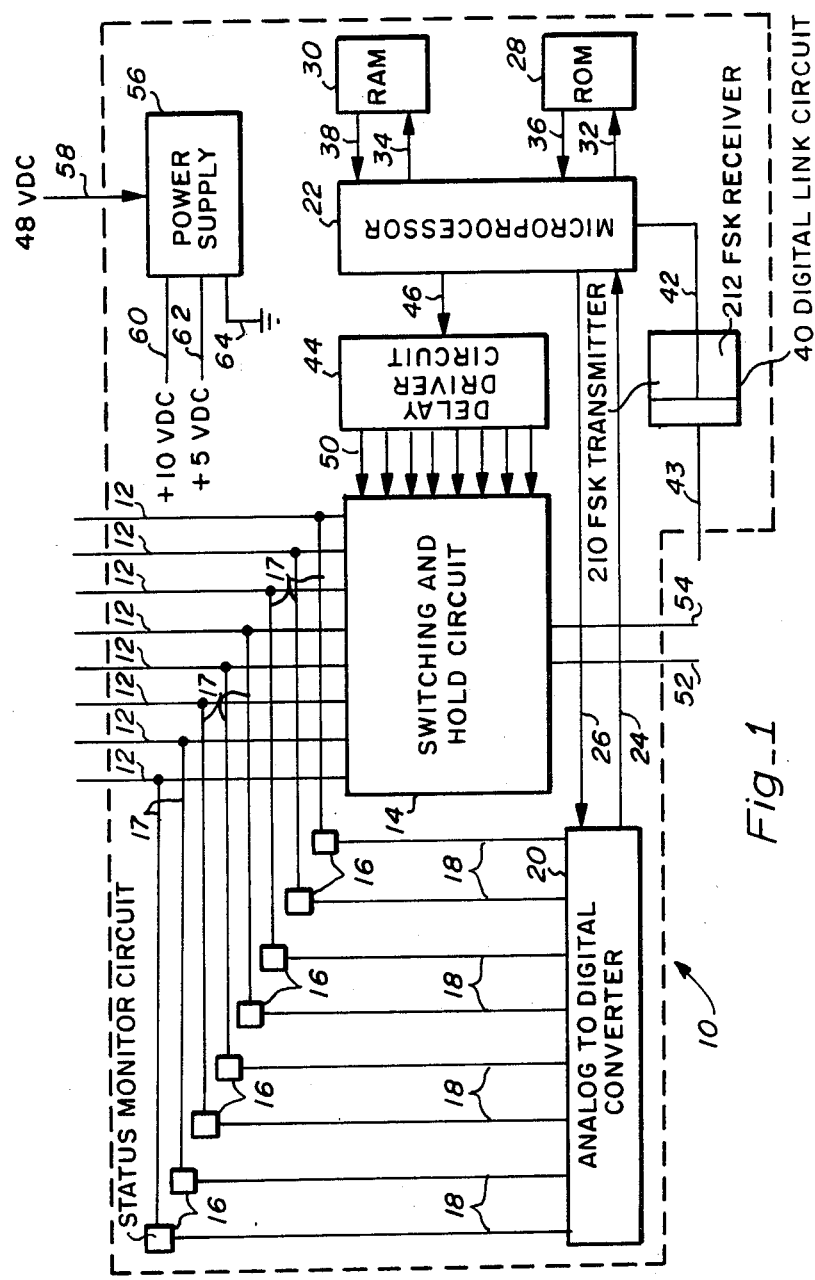
Fig_1

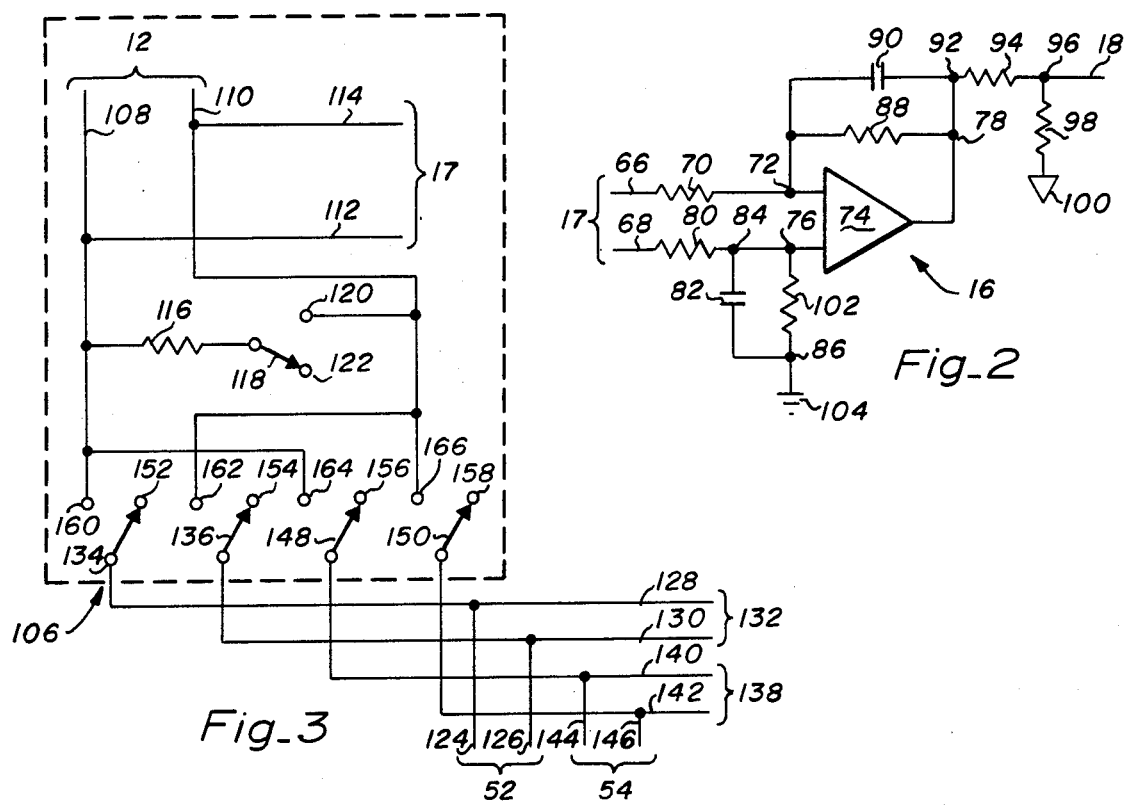
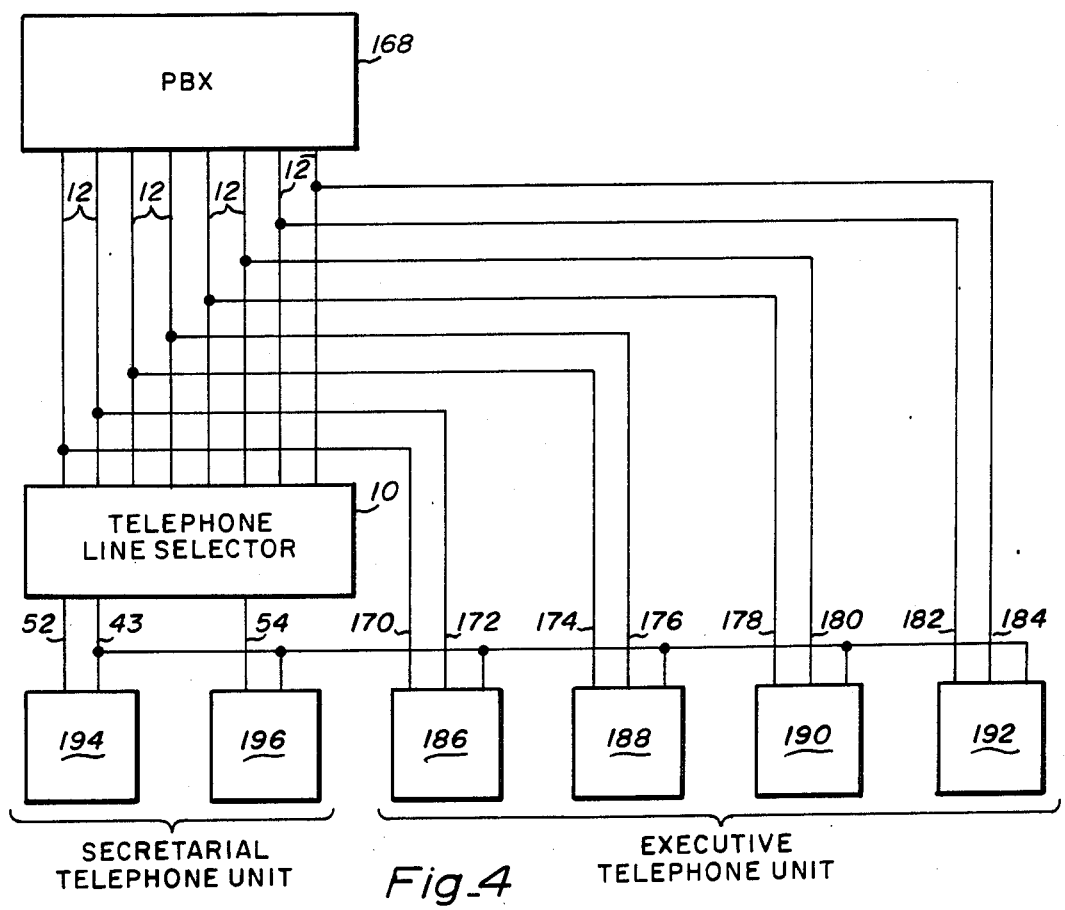

TELEPHONE LINE SELECTOR FOR USE WITH A PBX

A microfiche appendix comprising 77 frames contained on 2 microfiche is part of this application and is on file with the Patent and Trademark Office.

BACKGROUND OF THE INVENTION

1. Field of the Invention

The invention relates generally to telephone line selectors and more particular to telephone line selectors wherein a plurality of telephone lines are controlled by a microprocessor independently of a PBX.

2. Description of the Prior Art

Presently, in situations where a large number of telephone units are used by an organization it has been found that it is economical to use a PBX (Private Branch Exchange) as an interface between telephone lines provided by commercial telephone company and the organization's internal telephone network. The PBX permits a large number of internal telephone units to effectively use a small number of outside telephone lines. Outgoing calls go through the PBX and are directed to available outside telephone lines. Incoming calls are directed to the appropriate telephone unit through the PBX. Internal calls are made through PBX which connects one internal line to another.

With a PBX alone it is not possible to break up an organization's internal telephone system into groups of phones which are associated by work groups within the organization such that a call coming into that work group could be answered by a secretary assigned to that particular work group.

This shortcoming has been partially overcome by the use of a 1A2 key systems in conjunction with a PBX. By connecting a 1A2 key system to a PBX and wiring the telephone units of a work group to the 1A2 key system, it is possible to have a secretary monitor calls for members of the work group. However, the cabling and installation costs of such a system are high. Usually a twenty-five pair wire cable or larger is used in conjunction with the 1A2 key system. The cable is bulky and difficult to run. The wiring must run from the PBX to the place where the work group telephone units are located. The sheer size of the cable and the lengths of the cable needed increase its costs significantly. Also the difficulty in running such a bulky cable through walls or other passages increases the time necessary for installation which means an increase in the installation costs.

When it becomes necessary to move equipment associated with a work group using a 1A2 key system in conjunction with a PBX, the same difficulties and increased expenses are experienced because the entire twenty-five pair cable must be rerouted to the new location.

Furthermore, the 1A2 key system is not controlled by a microprocessor and therefore does not have the flexibility inherent with a programmable system.

SUMMARY OF THE PRESENT INVENTION

It is therefore an object of the present invention to provide a telephone line selector which permits a group secretary for a work group to have access to the plurality of telephone lines associated with the work group such that the secretary can screen incoming calls or answer for absent or occupied members of the work group depending on the desires of the individual group members and have information concerning the status of each telephone line available.

It is a further object to provide a telephone line selector which permits ease of installation of the work group telephone units associated therewith.

It is a further object to provide a telephone line selector which reduces the installation cost of the work group telephone units associated therewith by using four pair or less wire rather than twenty-five pair or greater wire.

It is a further object to provide a telephone line selector which increases the ease of changes in location of telephone units subsequent to initial installation.

It is a further object to provide a telephone line selector which reduces the cost of changes in location of telephone units subsequent to initial installation.

Briefly, the present invention includes a switching and hold circuit which receives a plurality of telephone lines from a PBX. The telephone lines are also connected to executive telephone units which are associated as a work group. Also connected to the plurality of telephone lines is a status monitor circuit. A relay driver circuit is controlled by a microprocessor. The relay driver circuit selectively operates a plurality of switches associated with the switching and hold circuit by a plurality of relay coils. The status monitor circuit is linked to an analog to digital converter by a data transmission means. The analog to digital converter is linked to the microprocessor by other data transmission means.

A Random Access Memory (RAM) and a Read Only Memory (ROM) are associated with the microprocessor such that the microprocessor can be programmed to monitor and control the telephone lines received from the PBX. A digital link provides a path for the transmission of data to and from the microprocessor and the executive telephone units associated with the work group and one or more secretarial telephone units.

The microprocessor is programmed such that it will cause the relay driver circuit and switch and hold circuit to selectively connect one of the telephone lines to a secretarial telephone unit or place it on hold, in response to a digital signal received over the digital link. The microprocessor also receives data from the analog to digital converter corresponding to the status of the telephone lines. This is used by the microprocessor to transmit digital signals over the digital link which is used by the secretarial telephone units to display the status (ringing, on hold, in use, or idle) of each telephone line.

The telephone line selector is typically located in the same location as the PBX such that telephone lines from the PBX can be conveniently wired to the telephone line selector. From the telephone line selector "skinny wire", i.e. three pair wire, is run to the location of the work group and secretarial telephone units. Where the building in which the telephone units are located is wired with three pair wire and it is necessary to change location, it is simply a matter of moving a telephone unit to a new location and reconnecting it to a three pair wire already at the new location and then making wiring changes between the PBX and telephone line selector which is relatively simple due to their proximity to each other.

An advantage of the telephone line selector of the present invention is that a secretary has status information concerning and access to each telephone line associated with a work group.

Another advantage is that the telephone line selector permits ease of installation of the work group telephone units.

A further advantage is that the telephone line selector reduces installation costs.

A further advantage is that the telephone line selector facilitates changes in telephone unit location.

A further advantage is that the telephone line selector reduces the cost associated with telephone unit location changes.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a block diagram of a telephone line selector in accordance with the present invention;

FIG. 2 is a circuit diagram of a status monitor circuit included within the telephone line selector of FIG. 1;

FIG. 3 is a switching and hold subcircuit as used in the present invention; and

FIG. 4 is a block diagram showing the relationship of the telephone line selector to the telephone units associated within a work group.

DETAILED DESCRIPTION OF THE PREFERRED EMBODIMENT

In FIG. 1, there is illustrated a telephone line selector referred to by the general reference numeral 10 and incorporating the present invention. The telephone line selector 10 includes a plurality of telephone lines 12. A switching and hold circuit 14 is connected to the plurality of telephone lines 12. Also connected to the plurality of telephone lines 12 is a plurality of status monitor circuits 16 by a plurality of connecting lines 17 such that there is a status monitor circuit for each individual telephone line. A plurality of status outputs 18 are received by an analog to digital converter 20. The analog to digital converter 20 is in communication with a microprocessor 22 over a digital input line 24 and a digital output line 26. The microprocessor 22 is connected to a read only memory device 28 and a random access memory 30 over an address bus 32 and 34 and a data bus 36 and 38, respectively. A digital link circuit 40 is connected to microprocessor 22 by a digital line 42. A digital link 43 is connected to digital link circuit 40 and extends external to telephone line selector 10.

A relay driver circuit 44 is connected to microprocessor 22 by a data transmission line 46. The relay driver circuit 44 controls various switches associated with the individual lines of the plurality of telephone lines 12 and such control is represented by a plurality of control lines 50 of FIG. 1. A first secretarial line 52 and a second secretarial line 54 are the output of switching and hold circuit 14.

A power supply 56 is provided with a 48 VDC input 58 and a +10 VDC output 60, a +5 VDC output 62 and a path to ground 64. Power is supplied to the various components and circuits of telephone line selector 10 as is appropriate.

The circuit components of status monitor circuit 16 are illustrated in FIG. 2. Each of the remaining status monitor circuits 16 are identical to that depicted in FIG. 2. Connecting line 17 is comprised of a first wire 66 and a second wire 68. A first resistor 70 is connected between wire 66 and a first input terminal 72 of a differential amplifier 74 which also has a second input terminal 76 and an output terminal 78. A second resistor 80 is connected between wire 68 and second input terminal 76. A capacitor 82 is connected between a terminal 84 and a terminal 86. A third resistor 88 is connected between first input terminal 72 and output terminal 78. A capacitor 90 is connected between first input terminal 72 and a terminal 92. A fourth resistor 94 is connected between terminal 92 and a terminal 96. A fifth resistor 98 is connected between terminal 96 and a ground 100. A sixth resistor 102 is connected between second input terminal 76 and terminal 86. Capacitor 82 and sixth resistor 102 lead to a ground 104 through terminal 86. The output of status monitor circuit 16 is transmitted over status output 18.

In FIG. 3, there is illustrated a switching and hold subcircuit referred to by the general reference numeral 106. For each telephone line 12 there is a switching and hold subcircuit 106, which, when connected to each other as described below, comprise switching and hold circuit 14. Telephone line 12 comprises a first wire 108 and a second wire 110. A first lead 112 and a second lead 114 comprising connecting lines 17 are connected to wires 108 and 110 respectively. Connected between wires 108 and 110 is a resistor 116 in series with a hold switch 118 having an on terminal 120 and an off terminal 122.

First secretarial line 52 comprises wires 124 and 126 which are connected to wires 128 and 130, respectively, to form first secretarial bus 132. Wires 108 and 110 are connectable to the first secretarial bus 132 through a pair of switches 134 and 136 in a similar manner second secretarial line 54 is connected to a second secretarial bus 138, comprising wires 140 and 142, by wires 144 and 146. Second secretarial bus 138 is connected to wires 108 and 110 through a pair of switches 148 and 150.

For each of the telephone lines 12 connected to switching and hold circuit 14 there is an associated switching and hold subcircuit 106. Each switching and hold subcircuit 106 can be connected to either the first secretarial bus 132 or second secretarial bus 138 such that the telephone line 12 associated with a particular switching and hold subcircuit 106 may be connected to either the first or second secretarial lines 52 and 54. In an alternative configuration a single secretarial line is provided, eliminating the need for second secretarial bus 138 and switches 148 and 150. Each of the switches 134, 136, 148 and 150 have an open terminal 152, 154, 156 and 158 and a closed terminal 160, 162, 164 and 166.

In FIG. 4, there is illustrated one example of how telephone line selector 10 interfaces with various components of an internal telephone system. A PBX 168 receives a plurality of telephone trunk lines (not shown) from a commercial telephone system. Telephone line selector 10 is connected to PBX 168 by the plurality of telephone lines 12. Although the telephone line selector 10 described herein is designed to accommodate eight telephone lines, a greater or lesser number of telephone lines can be used with appropriate modification of telephone line selector 10. Tapping off of telephone lines 12 are first through eighth executive lines 170, 172, 174, 176, 178, 180, 182 and 184, respectively.

First and second executive lines 170 and 172 connect to a first executive telephone unit 186. Third and fourth executive lines 174 and 176 connect to a second executive telephone unit 188. Fifth and Sixth executive lines 178 and 180 connect to a third executive telephone unit 190. Seventh and Eighth executive lines 182 and 184 connect to a fourth executive telephone unit 192. First secretarial line 52 connects to a first secretarial unit 194. Second secretarial line 54 connects to a second secretarial telephone unit 196. The digital link 43 extends from multiplexer 10 and connects to telephone units 186, 188, 190, 192, 194, and 196.

Typically, each telephone unit contains its own microprocessor as described in an application for a "Microprocessor Controlled Telephone Unit" Ser. No. 06/540,136 filed concurrently by the same inventors. The digital link 43 between the various telephone units permits the exchange of data which can then be processed in accordance with the programming of the particular microprocessor involved to accomplish a desired result, either with respect to a particular telephone unit or for the work group associated with telephone line selector 10.

The digital link circuit 40 comprises an FSK transmitter 210 and receiver 212 which are well known in the art. Digital signals are received from microprocessor 22 over digital line 42 and thereafter sent to the various telephone units associated with the work group over digital link 43. In a similar manner digital signals generated by the telephone unit associated with the work group are sent over digital link 43 to digital link circuit 40 where the signal is received and transmitted to microprocessor 22 over digital line 42.

The purpose of the telephone line selector is to permit a large number of telephone lines to be connected to one or two lines, depending on whether one or two secretarial telephone units are used. The telephone line selector 10 also provides status information for the telephone lines 12 which is transmitted over digital link 43 to secretarial telephone units 194 and 196 where it can be displayed.

When a call comes in on one of the telephone lines 12, the status monitor circuit 16 associated with the particular line senses a change in voltage across wires 66 and 68. The status monitor circuit 16 generates an analog signal which is transmitted over the status output 18 associated with the particular status monitor. That analog signal is received by analog-to-digital converter 20 where it is converted into a digital signal. Microprocessor 22 is programmed to periodically request data which has been processed by the analog-to-digital converter 20 and thus the digital signal corresponding to the voltage change sensed by status monitor circuit 16 is received by microprocessor 22. The microprocessor 22 in response to its programming transmits data indicating the presence of an incoming call to the digital link circuit 40 over digital line 42 which in turn is received by secretarial telephone units 194 and 196 over digital link 43. The digital signal corresponding to an incoming call is used by the microprocessor of the secretarial telephone units 194 and 196 to activate a status display showing that a particular telephone line 12 is ringing. Depending on the ring arrangement in effect between executive telephone units 186, 188, 190 and 192 and the secretarial telephone units 194 and 196, the signal may be used to cause a ring tone to be generated and broadcast at the secretarial telephone units 194 and 196. The various ring arrangements are discussed in the co-pending application mentioned above. The remaining explanation of the operation of telephone line selector 10 will assume that the ring arrangment is such that the particular telephone line 12 on which an incoming call is present is to be answered at a secretarial telephone unit 194 or 196 rather than at the executive telephone unit 186, 188, 190 or 192 associated with that particular telephone line 12.

When an incoming call rings at a secretarial telephone unit 194 or 196, the secretary looks at the status display to see which line is ringing and then activates a button associated with the ringing line. This action causes the microprocessor of the secretarial telephone unit 194 or 196 to send a digital signal over the digital link 43. This digital signal is received by telephone line selector 10 through data link circuit 40 where it is sent to microprocessor 22 over digital line 42. In accordance with the programming of microprocessor 22, a signal is generated in response to the signal received from the secretarial telephone unit 194 or 196, and is transmitted to the relay driver circuit 44 over data transmission line 46.

The signal received by the relay driver circuit 44 from microprocessor 22 causes a coil to energize. The coil energized is associated with the particular telephone line 12 to which the secretarial telephone unit is to be connected. Using the switching and hold subcircuit 106 depicted in FIG. 3 as being that one associated with the desired telephone line 12, and assuming that first secretarial 194 is the unit to be connected to line 12, then the particular coil energized in relay driver circuit 14 causes switches 134 and 136 to move from open terminals 152 and 154 to close terminals 160 and 162 thus connecting wires 108 and 110 comprising telephone line 12 to first secretarial telephone unit 194 through first secretarial bus 132 and wires 124 and 126 comprising first secretarial line 52. In this manner the telephone line selector 10 has permitted a large number of telephone lines to be monitored and answered at a single location.

The operation of telephone line selector 10 is controlled by microprocessor 22 which is programmed to respond to various data input received from the components of the telephone line selector or data received over digital link 43 between telephone line selector 10 and the executive telephone units 186, 188, 190 and 192 of the work group. With telephone line selector 10 one or two secretaries are able to monitor a plurality of telephone lines 12 associated with the work group. The status of each line (free, hold, ringing or in use) is displayed on a status display on the secretarial telephone units 194 and 196. The status information displayed is a result of the status monitor circuits 16 of telephone line selector 10 which are monitored by the microprocessor 22 which generates the signal corresponding to the status of each telephone line 12 and transmits a digital signal to the secretarial telephone units 194 and 196 over the digital path 43.

Any of the telephone lines 12 may be selected by the secretary associated with either secretarial telephone unit 194 and 196, and a digital signal sent over the digital link 43 to microprocessor 22 where a signal is generated directing the relay driver circuit 44 to close the appropriate switches (e.g. switches 134 and 136) to connect the selected telephone line with the secretarial telephone unit 194 or 196. In a similar manner, a signal from the secretarial telephone unit 194 or 196 can be received by microprocessor 22 which thereafter directs a particular telephone line 12 to be placed on hold by an appropriate signal through relay driver circuit 44 to switch and hold circuit 14.

A program for microprocessor 22 in accordance with the preferred embodiment of the present invention is set forth in the microfiche appendix reference above. The program was written for use with an INTEL 8031 microprocessor and it should be noted that other microprocessors can be used with appropriate modifications of the programs.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A telephone line selector comprising:
   a plurality of telephone lines from a PBX;
   a plurality of means for individually monitoring the status of each of said telephone lines and generating a signal corresponding to said status;
   a plurality of means for selectively connecting said telephone lines, one at a time, to a first or second secretarial telephone unit;
   a plurality of means for selectively placing said telephone lines on hold;
   a programmable microprocessor;
   a means for transmitting each status signal to said microprocessor;
   a means for transmitting digital signals between said microprocessor and executive telephone units and secretarial telephone units associated in a work group; and
   a means for transmitting control signals from said microprocessor to said plurality of means for selectively connecting said telephone lines and for selectively placing said telephone lines on hold such that the telephone lines are connected to the first or second secretarial telephone unit or placed on hold in response to digital signals received by said microprocessor over said means for transmitting digital signals;
   whereby the telephone line selector provides selective connection of said telephone lines to said secretarial units of said work group.

2. The device of claim 1, wherein
   said plurality of means for monitoring the status of said telephone lines are electronic circuits including differential amplifiers which sense voltages across said telephone lines and produce analog signals which when converted to digital signals are used by the microprocessor to determine the status of said telephone lines.

3. The device of claim 1, wherein
   said plurality of means for selectively connecting said telephone lines and said plurality of means for selectively placing said telephone lines on hold include a relay driver circuit and a switching and hold circuit comprising a number of switching and hold subcircuits equal to the number of said telephone lines.

4. The device of claim 1, wherein
   a random access memory device and a read only memory device are connected to said programmable microprocessor.

5. The device of claim 1, wherein
   said means for transmitting digital signals between said microprocessor and executive and secretarial telephone units associated in a work group includes FSK transmitter and receiver circuits such that digital signals may be sent and received by said microprocessor.

6. A telephone line selector comprising:
   a plurality of telephone lines from a PBX;
   a plurality of status monitor circuits connected to said telephone lines such that there is one status monitor circuit for each telephone line;
   a switching and hold circuit connected to said telephone lines comprising a switching and hold subcircuit for each telephone line;
   an analog-to-digital converter electrically connected to said status monitor circuits such that a signal corresponding to the status of each individual telephone line is received by said converter and converted into a digital signal;
   a microprocessor;
   a digital input line connecting said analog-to-digital converter to said microprocessor;
   a digital output line connecting said microprocessor to said analog-to-digital converter;
   a random access memory device connected to said microprocessor by an address bus and a data bus;
   a read only memory device connected to said microprocessor by an address bus and data bus;
   a relay driver circuit connected to said microprocessor such that control signals from said microprocessor may selectively energize relay coils to operate switches within said switching and hold circuit such that one of said telephone lines may be connected to a secretarial telephone unit;
   a digital link circuit connecting said microprocessor to a digital link to telephone units associated within a work group;
   whereby due to the programming of said microprocessor digital signals corresponding to the individual status of each of said telephone lines are generated by said microprocessor and transmitted over said digital link to telephone units within the work group; and digital signals are received by said microprocessor which will cause generation of signals directing the connection of one of said telephone lines to a first or second secretarial unit or directing a telephone line to be placed on hold.

7. The device of claim 1, wherein each of said means for individually monitoring the status of said telephone lines comprises:
   a differential amplifier;
   a first resistor connected intermediate a first wire of one of said telephone lines and a first input of said differential amplifier;
   a second resistor connected intermediate a second wire of said telephone line and a second input of said differential amplifier;
   a third resistor connected intermediate the second input of said differential amplifier and ground;
   a first capacitor connected parallel to said third resistor;
   a fourth resistor connected intermediate said first input and an output of said differential amplifier;
   a second capacitor connected parallel to said fourth resistor;
   a fifth resistor connected intermediate the output of said differential amplifier and said means for transmitting each status signal to said microprocessor; and
   a sixth resistor connected intermediate an input of said means for transmitting each status signal to said microprocessor and ground;

whereby any one of a plurality of voltage changes which represent the status of said telephone line are detected across said telephone line and a corresponding analog signal is produced.

8. The device of claim 6, wherein each of the status monitor circuits comprises:

a differential amplifier;

a first resistor connected intermediate a first wire of one of said telephone lines and a first input of said differential amplifier;

a second resistor connected intermediate a second wire of said telephone line and a second input of said differential amplifier;

a third resistor connected intermediate the second input of said differential amplifier and ground;

a first capacitor connected parallel to said third resistor;

a fourth resistor connected intermediate the first input and an output of said differential amplifier;

a second capacitor connected parallel to said fourth resistor;

a fifth resistor connected intermediate the output of said differential amplifier and an input of said analog-to-digital converter; and a sixth resistor connected intermediate the input of said analog-to-digital converter and ground;

whereby any one of a plurality of voltage changes which represent the status of said telephone line are detected across said telephone line and a corresponding analog signal is produced.

* * * * *